United States Patent [19]

Shutov et al.

[11] Patent Number: 5,397,065

[45] Date of Patent: * Mar. 14, 1995

[54] SOLID STATE SHEAR EXTRUSION PULVERIZATION

[75] Inventors: Fyodor Shutov, Downers Grove; George Ivanov, Chicago; Hamid Arastoopour, Darien, all of Ill.

[73] Assignee: Illinois Institute of Technology, Chicago, Ill.

[*] Notice: The portion of the term of this patent subsequent to Mar. 7, 2012 has been disclaimed.

[21] Appl. No.: 140,600

[22] Filed: Oct. 28, 1993

Related U.S. Application Data

[63] Continuation-in-part of Ser. No. 981,161, Nov. 24, 1992, abandoned, which is a continuation-in-part of Ser. No. 971,147, Nov. 3, 1992, abandoned.

[51] Int. Cl.$^6$ ............................................. B02C 19/22
[52] U.S. Cl. ...................................... 241/16; 241/17; 241/23; 241/65; 241/260.1; 241/261; 366/85; 366/88; 366/89
[58] Field of Search ...................... 241/16, 17, 23, 60, 241/65, 260.1, 261; 264/211.18, 211.23; 425/204, 208, 379.1; 366/83, 84, 85, 88, 89

[56] References Cited

U.S. PATENT DOCUMENTS

| | | | |
|---|---|---|---|
| 3,102,716 | 9/1963 | Frankel | 366/88 |
| 3,104,420 | 9/1963 | Selbach | 366/88 X |
| 3,164,375 | 1/1965 | Fenkel | 366/89 X |
| 3,525,124 | 8/1970 | Ocker | . |
| 3,728,053 | 4/1973 | Saillhard et al. | 425/208 X |
| 3,814,566 | 6/1974 | Sharp | 425/371.1 X |
| 3,874,835 | 4/1975 | Rositer et al. | 241/60 X |
| 3,889,889 | 6/1975 | Sawa | . |
| 4,041,115 | 8/1977 | Jenkins et al. | . |
| 4,090,670 | 5/1978 | Bennett | . |
| 4,098,463 | 7/1978 | Lowry | . |
| 4,118,163 | 10/1978 | Lee | 366/88 X |
| 4,181,647 | 1/1980 | Beach | 366/89 X |
| 4,184,772 | 1/1980 | Meyer | 366/89 X |
| 4,367,190 | 1/1983 | Beach | 425/208 X |
| 4,408,888 | 10/1983 | Hunsbk | 366/89 X |
| 4,511,091 | 4/1985 | Vasco | . |
| 4,607,796 | 8/1986 | Enikolopov et al. | . |
| 4,607,797 | 8/1986 | Enikolopow et al. | . |
| 4,650,126 | 3/1987 | Feder et al. | . |
| 4,708,617 | 11/1987 | Herrington | 425/208 X |
| 4,716,000 | 12/1987 | Kerschbaum et al. | 425/208 X |
| 4,875,847 | 10/1989 | Wenger et al. | . |
| 4,890,996 | 1/1990 | Shimizu | . |
| 4,968,463 | 11/1990 | Levasseur | . |
| 4,997,131 | 3/1991 | Tolenen | 241/260.1 X |
| 5,026,512 | 6/1991 | Chang | . |
| 5,073,320 | 12/1991 | Sterzel | 264/211.23 X |
| 5,088,914 | 2/1992 | Brambilla | 366/88 X |

FOREIGN PATENT DOCUMENTS

| | | |
|---|---|---|
| 9114552 | 10/1991 | European Pat. Off. . |
| 2196242 | 3/1974 | France . |
| 3332629 | 3/1985 | Germany . |
| 4021550 | 1/1991 | Germany . |
| 4130315 | 1/1993 | Germany . |
| 334404 | 1/1959 | Switzerland . |
| 456937 | 7/1968 | Switzerland . |
| 1184717 | 3/1970 | United Kingdom . |

OTHER PUBLICATIONS

Nikoli S. Enikolopian, "Some Aspects of Chemistry and Physics of Plastic Flow", Pure & Appl. Chem., vol. 57, No. 11, pp. 1707-1711, (1985).

Amer. Inst. Chem. Engrs; 1992 Annual Meeting, Nov. 1-6, 1992 Thermoplastic Waste Recycling Process Using Solid State Shear Extruse Extended Abstracts, p. 441, Abstract No. 187e.

*Primary Examiner*—Frances Han
*Attorney, Agent, or Firm*—Speckman, Pauley & Fejer

[57] ABSTRACT

A process and apparatus for pulverization of natural and synthetic polymeric material by heating to a premelt or softening temperature below its melting point, cooling and applying normal and shear stresses sufficient to form fine powder, and fluidizing the powder in a gas stream preventing its agglomeration. The same process and apparatus is suitable for enhancement of reactivity of polymeric and solid monomeric material to form homopolymers, copolymers, and new polymeric materials.

52 Claims, 1 Drawing Sheet

| FEEDING | HEATING | COOLING / POWDERIZATION | FLUIDIZING |
|---------|---------|-------------------------|------------|
| ZONE (1) | ZONE (2) | ZONE (3) | ZONE (4) |

SOLID STATE SHEAR EXTRUSION PULVERIZATION

CROSS REFERENCE TO RELATED APPLICATIONS

This application is a continuation-in-part of application Ser. No. 07/981,161, filed Nov. 24, 1992, now abandoned, which is a continuation-in-part of Ser. No. 07/971,147, filed Nov. 3, 1992, now abandoned.

BACKGROUND OF THE INVENTION

1. Field of the Invention

This invention relates to a solid state shear extrusion process and apparatus for continuous pulverization to fine particles of a wide variety of solids and their mixtures, such as, polymers, copolymers, homopolymers, agrowastes, rubber, wood chips, and mixtures of synthetic and natural polymers which have been resistant to such fine pulverization. The invention is particularly well suited for fine pulverization of thermoplastic polymers. The process and apparatus of this invention is especially useful for recycling of synthetic and natural polymers and mixed polymer wastes using a non-cryogenic and low power consumption technique.

2. Description of Related Art

Currently, three basic reclaiming processes of virgin and used plastics are practiced: Chemical, which include chemical treatment, as well as, pyrolysis, hydrolysis, and incineration; Physical, which include melting and subsequent extrusion, injection molding, and pressure molding; and Mechanical, which include granulation, densification, agglomeration, and pulverization. Presently used processes have disadvantages of high energy consumption, decrease in original properties of the polymers, applicability to only specific polymers, and environmental undesirability.

U.S. Pat. No. 4,090,670 teaches recovery of rubber from scrap vulcanized rubber tires by raising the surface temperature sufficiently to devulcanize followed by removal of the devulcanized material, such as by rasping. This method is limited to rubber and does not produce fine powders as desired for many reuse applications.

Reclamation of thermoplastic materials including shredding, grinding and comminuting is exemplified by: U.S. Pat. No. 4,968,463 teaching shredding waste plastic to about 100 mm and grinding to under about 40 mm, followed by drying preheating to 80° to 160° C., kneading at 120° to 250° C., and injection molding or extrusion; U.S. Pat. No. 4,650,126 teaching heating plastic particles to melt the surface to retain a grinding aid thereon and maintaining a counter-rotating attrition mill at a temperature to retain nearly all of the grinding aid on the softened polymer particles during grinding, followed by an air stream which serves to separate the grinding aid and as a material carrier medium; U.S. Pat. No. 4,511,091 teaching thermoplastic scrap recovery combined with phonograph record pressing wherein the hot trimmed waste is cooled, ground, and mixed with virgin material for formation of phonograph records; and U.S. Pat. No. 4,098,463 teaching a liquid cooling spray to maintain the temperature in a cutting chamber such that the plastic is hard which reduces the fibers imbedded in the comminuted particles from plastic electrical or telephone cord insulation.

Various screw devices are known for conveyance and processing in the synthetic polymer industry. Molding of products from a mixture of thermoplastic polymers or a thermoplastic polymer and an inorganic material by control of crystallization in a screw extruder with temperature control in a first portion within 35° C. below the material melting point and the temperature in a second portion within 35° C. above the material melting point with the maximum temperature at the outlet is taught by U.S. Pat. No. 5,026,512. U.S. Pat. No. 4,890,996 teaches continuous granulating by melting, kneading and granulating macromolecules wherein a double screw kneader without lateral communication is capable of adjusting the degree to which material is kneaded by axial adjustment of the cylinders and screws with respect to each other.

Conical screw sections are known to be used for specific purposes. U.S. Pat. No. 4,875,847 teaches a twin screw extruder, especially suited for viscous materials, having frusto-conical screw sections and separate barrel sections at the outlet end providing bearing-type support for the separate screws. U.S. Pat. No. 3,525,124 teaches an extracting apparatus having screw-threaded shafts rotatable within a housing and having conveying and milling sections with an obstruction section between for pressure sealing. The screw and the housing may be tapered to form the obstruction section, thereby providing independent heat and pressure control in the conveying and milling sections.

Chemical and physical aspects of transformations of polymeric materials, such as pulverization, under simultaneous high pressure and shear is described in Nikolai S. Enikolopian, "Some Aspects of Chemistry and Physics of Plastic Flow", Pure & Appl. Chem., Vol. 57, No 11, pp. 1707–1711, (1985).

U.S. Pat. No. 4,607,797 teaches pulverization of fused polymers in an extrusion apparatus having a barrel with at least one cylindrical rotatable screw. When two screws are used, they are co-rotational. The '797 patent teaches that material is fed to one end of the barrel, heated to above its fusing temperature in a first zone, cooled to below its solidification temperature with simultaneous pre-crushing and pulverizing of the solidified material in a second zone, and discharge of the powdered material from the opposite end of the barrel. Screw action is used to convey the material through the barrel and substantially elliptical or triangular kneading or pulverizing discs non-rotatably mounted on the screw in the cooling zone provide the pre-crushing and pulverizing. The process is carried out at 0.25 to 0.30 MPa. This process is said to continuously produce particles having a very uniform grain size, in the case of polyethylene only 2% larger than 160 microns. The '797 patent distinguishes its process from the prior art by allowing solidification of the fused material within the extrusion apparatus.

U.S. Pat. 4,607,796 teaches pulverization of rubber and vulcanization products in a standard single- or multiple-screw extruder by compressing at a pressure of 0.2 to 0.7 MPa, then subjecting the compressed material to a shear force of 0.03 to 5 N/mm$^2$ at a pressure of 0.2 to 50 MPa and temperature of 80° to 250° C. forming hot sheared material which is subjected to a shearing force of 0.03 to 5 N/mm$^2$ at a pressure of 0.2 to 50 MPa and temperature of 15° to 60° C. forming cooled powder material. Addition of granulated polyethylene to butyl rubbers is necessary to obtain finely dispersed powders. This process is said to result in particles not exceeding 500 micrometers in the case of natural rubber and 300 micrometers with other rubbers.

SUMMARY OF THE INVENTION

Natural and synthetic polymer wastes are increasing and environmental concerns about their disposition render recycling necessary. Thermoplastic polymers, particularly polyethylene, have large commercial uses and provide a large source of material for potential recycling. However, many reclamation processes to date have been limited to certain types of wastes and particularly limited with respect to mixed wastes, have been uneconomical, particularly with respect to energy consumption, and have not provided reclaimed material in a form conducive to re-use manufacturing. Solid state shear extrusion pulverization according to this invention requires low energy input, about one fifth the energy required in presently used cryogenic pulverization, and provides finer and more uniform powders, than presently known pulverization techniques known to the inventors, which may be used in a broader range of re-use or end use manufacture.

It is one object of this invention to provide a low energy consumption process and apparatus for pulverization of polymeric materials to fine powders.

It is another object of this invention to provide a process and apparatus for pulverization of a wide variety of natural and synthetic polymeric materials to form a fine powder.

Yet another object of this invention is to provide a process and apparatus suitable for economical recycling of a wide variety of natural and synthetic polymer wastes, particularly polyethylene, including mixed wastes, by solid state shear extrusion pulverization of such waste materials forming fine powders suitable for use in new product production.

Another object of this invention is to provide fine polymeric particles for coating and preservation of metals, stones and concretes, such as used in monuments, buildings, and bridges, and concrete pipes and materials exposed to corrosive environments. The object is to provide a substitute for liquid paints and coatings based upon organic non-environmentally friendly solvents with fine particles coatings which are more durable, stable and environmentally safe when applied to surfaces, especially metal and porous mineral surfaces.

Still another object of this invention is to provide a process and apparatus to enhance reactivity of polymeric and solid monomeric materials in the formation of homopolymers, copolymers and polymeric materials not achievable by prior methods of reaction.

These and other objects and advantages of the invention are achieved by heating a thermoplastic polymeric material, which thermally softens at a lower temperature than its melting temperature, to a softening or pre-melt temperature below its melting point, cooling the material and applying normal and shear forces sufficient to form fine powder of the polymeric material, and fluidizing the fine powder with further cooling in a gas stream thereby preventing agglomeration in materials having tendency to agglomerate. The heat applied to the materials decreases the physical bonds between macromolecules and enhances mechanical deformations. Suitable forces may be applied by application of torque up to about 40 MKg and pressure up to about 150 psig. Powders having a major portion of the particles with a weight average size of about 300 to about 900 microns can be produced in a single pass. Multiple passes by reprocessing through the same apparatus, or by passing through at least one additional similar apparatus, of oversized particles can result in a weight average particle size of 100 microns and less.

The process of this invention may be carried out on a continuous basis in a solid state shear extrusion pulverizer having a hollow generally converging barrel housing a generally converging twin screw extruder having generally converging conical meshing screws in at least the powder formation zone. Feed means are provided to feed polymeric material to a first zone at one end of the barrel and discharge means are provided for removal of pulverized powder from a fourth or expanding zone at the opposite end of the barrel. The materials screw feed in the first zone. Heating means are provided for heating the polymeric material to a pre-melt or softening temperature in the second zone. Suitable pre-melt or softening temperatures are those at which the material is softened and can be shaped by the extruder but not melted. These temperatures depend upon the polymer materials used and are readily ascertained by one skilled in the art. For most polymeric materials, heating to about 60° to about 300° C. and below the melting point of the polymer is suitable. Cooling means are provided for cooling the polymeric material from the pre-melt temperature to temperatures below the softening point of the material in a third zone adjacent the second zone. The temperature to which the material is cooled is again dependent upon the polymeric materials used and will be readily ascertained by one skilled in the art. For most polymeric materials, cooling to about 20° to about 100° C. is suitable. Means for applying normal and shear forces sufficient to form fine powders are provided in a third zone located between the second and fourth zones. Means are provided for fluidizing and further cooling the fine powder in a gas stream preventing its agglomeration in the latter portion of the third zone and in the fourth zone. Increase of the barrel diameter and increase in distances between the screw flights in the fourth zone contribute significantly in preventing agglomeration of materials and final production of fines. Means may be provided for separating produced particles over a preset desired size and returning these oversized particles for reprocessing through the same apparatus or passing the oversized particles to another similar apparatus for reprocessing to obtain desired small weight average size particles. Separation of oversized particles and reprocessing may be repeated several times to achieve desired very small particle sizes. Use of a plurality of apparatus provides continuous production of desired small particle size powder and allows the most advantageous operating conditions to be used for different particle size ranges.

The solid state shear extrusion pulverization process and apparatus of this invention provides continuous very fine pulverization, to average particle size of less than about 100 microns, of polymeric materials which have been recalcitrant to fine pulverization by prior processes and apparatus. The process of this invention utilizes low pressure and temperatures closer to ambient than prior processes with the major amount of supplied energy to the process being utilized to create normal and shear stresses on the particles to result in the very fine powder with low energy input. The process and apparatus of this invention are applicable to a variety of polymers, particularly thermoplastic polymers such as, low density polyethylene, rubber, mixtures of low density polyethylene and rubber, and low density polyethylene and wood, and copolymers. The fine polymeric powder produced by the process and apparatus of this invention enables much broader end uses as fillers and reinforcement agents in many types of matrices, such as polymer, ceramic, gypsum, concrete, and asphalt. This is important to practical utilization of products of recycling polymer wastes, both pre- and/or post-consumer, to reduce the environmental problems caused by such solid wastes.

BRIEF DESCRIPTION OF THE DRAWINGS

The above objects and further advantages of the invention will be apparent upon reading the preferred embodiments and reference to the drawing, wherein.

DESCRIPTION OF PREFERRED EMBODIMENTS

In the process of solid state shear extrusion pulverization according to this invention, polymeric granules, flakes or shreds of virgin or used synthetic or natural polymer, copolymer and homopolymer materials, or a mixture of such materials, are fed by any suitable feed means to a first zone at the large end of a hollow generally converging barrel housing a generally converging twin screw extruder having generally converging conical meshing screws. By the terminology "generally converging", it is meant that the cross section of the feed ends of the barrel and the screws are larger than the opposite discharge ends and in the powder formation zone, the convergence is continuous, forming conical screws in at least that zone. This terminology is intended to allow a larger shaped end section and smaller central sections, for example to accommodate bearing means. Generally, the screws may be cylindrical in the feed zone, have a definite conical convergence in the powder formation zone, and provide an expansion cross sectional area in the fourth or fluidizing zone. In preferred embodiments, continuously converging conical screws are used for the entire length of a barrel having converging walls in the powderization zone followed by diverging walls in the cooling/nonagglomerating zone.

Figure 1:
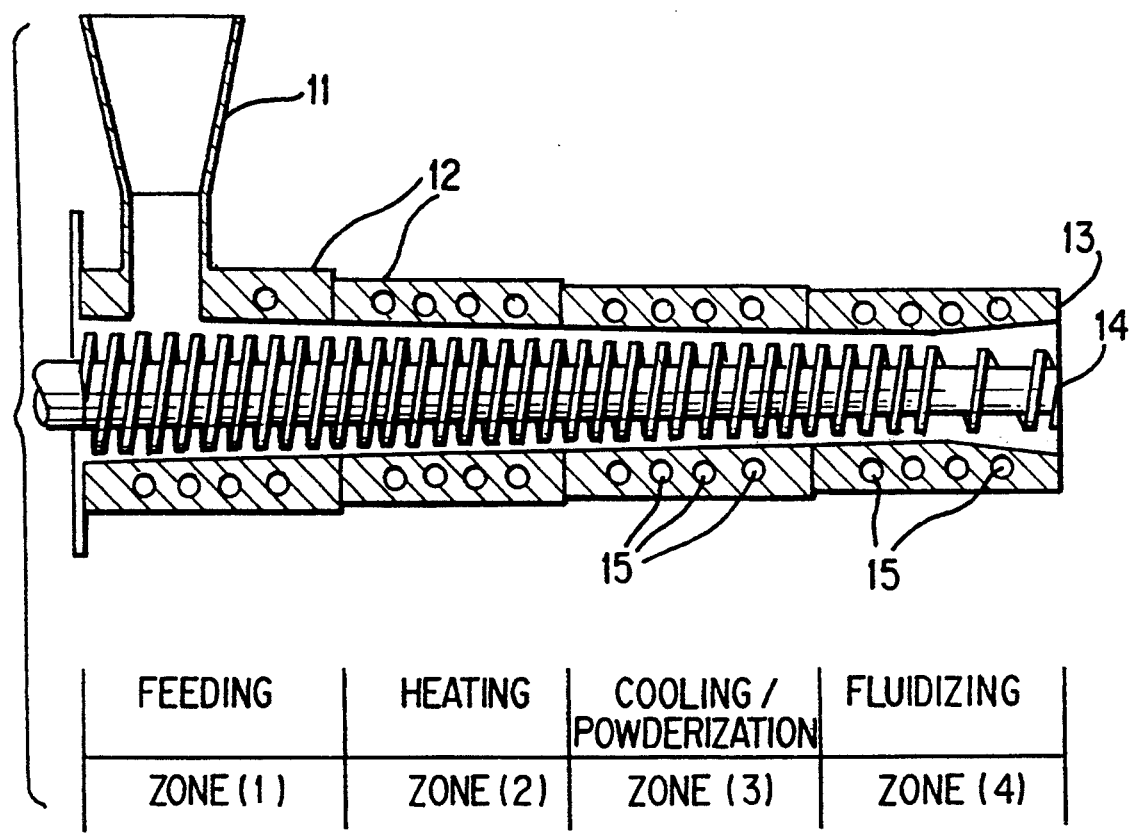
FIG. 1 is a longitudinal sectional view showing four zones of a conical counter-rotating screw apparatus according to one embodiment of this invention.
Figure 2:
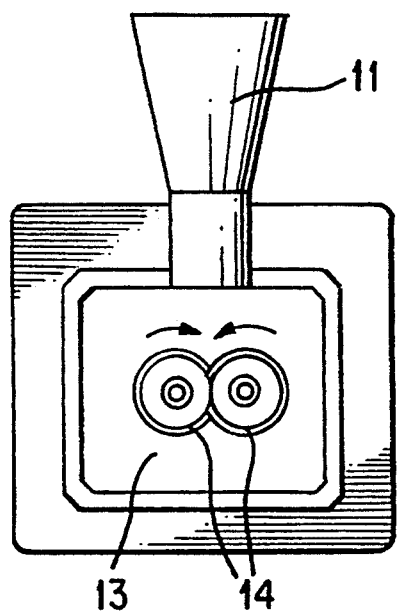
FIG. 2 is an end view of the apparatus shown in FIG. 1.

FIG. 1 is a longitudinal sectional view of an apparatus according to this invention showing feed hopper 11 for feeding polymer materials to feeding zone 1 within barrel 13 housing screws 14. Heaters 12 are provided in barrel walls in the region of heating zone 2. Cooling conduits 15 are provided in barrel walls in the region of cooling/powderization zone 3 and may be provided in the region of cooling/nonagglomerating zone 4. Increase in the diameter of the barrel opening in cooling/nonagglomerating zone 4 is shown. Also, increase in spacing of the flights on screw 14 in cooling/nonagglomerating zone 4 is shown. FIG. 2 shows the counter rotation of screws 14 within barrel 13.

The polymeric feed material may be fed to the first zone in a size range equal or less than the distance between screw flights and their depths, preferably about 1 mm to about 6 mm. Size reduction to these dimensions may be achieved by many methods known to the art. Suitable polymeric materials include polyethylene terephthalate, high-density polyethylene, low-density polyethylene, polypropylene, polyvinyl chloride, polystyrenes, polyacrylics, polycarbonates, polyamides, polyurethanes, rubber, and natural polymers such as wood and corn. Preferred polymeric materials include thermoplastic polymers. Mixtures of these materials or composites may be used. When materials recalcitrant to fine pulverization are present alone, it is desirable to form a mixture of such materials with at least one material which is readily pulverized to the desired fine particles by the process of this invention. Minor amounts of readily pulverized materials, about 5 to about 50 volume percent, depending greatly upon the materials, may be mixed with such recalcitrant materials to result in fine powder formation according to this invention. To accommodate recycling of waste polymeric materials, it may be desirable to have present minor amounts, up to about 30 volume percent, of pulverizable materials.

Heating means capable of heating the polymeric material in the second or heating zone to a softening or pre-melt temperature which is below its melting point are located in a suitable manner to achieve the desired temperature, at which a small shear stress may result in high deformation. Preferred temperatures are about 3° to about 50° C. below the melting point of the polymeric material. Any suitable heating means known to the art may be used, for example, the barrel may be electrically heated or a fluid heating jacket surrounding the barrel may be used in this region. In the second or heating zone where heating to a pre-melt temperature takes place, the meshing screws serve primarily to convey the material through the zone with an appropriate residence time to achieve the desired heating prior to entry to an adjacent cooling/powderization zone.

Cooling means capable of cooling the pre-melt polymeric material in the third or cooling/powderization zone to a temperature below the softening temperature of the material are located in a suitable manner to achieve the desired temperature. Any suitable cooling means known to the art may be used, for example, a fluid, liquid or gas, cooling jacket surrounding the barrel, dry ice, or the like, may be used in this region. In the early portion of the length of the third zone where cooling from the higher temperature takes place, the meshing screws serve primarily to convey and material through this region with an appropriate residence time to achieve the desired cooling. Cooling in the third zone forms thin solid film material and imparts very high normal and shear stresses in the thin film material. A pressure of about 0 to about 150 psig may be maintained in this portion of the barrel. Concurrently with formation of these high normal and shear stresses in the material in the third zone, it is desired that the meshing screws be conically shaped and mated to provide additional normal and shear stresses to the material sufficient to form fine powder. In preferred embodiments, the torque is about 2 to about 10 MKg. In preferred embodiments, the weight average fine powder particle sizes are less than about 250 microns and with reprocessing of the oversize fraction weight average particle sizes of less than 100 microns can be obtained.

The conically shaped meshing screws and processing parameters must be designed to provide sufficient residence time for formation of powder from a substantial portion of the material in the third zone and to provide necessary stresses to the material to achieve formation of the very fine powder of the above defined sizes. We have found that the conical shape and counter-rotation of the screws aid in imparting desired high stresses to the polymeric material. Drive means as known to the art are provided to rotate the opposing screws at about 4 to about 90 RPM, preferably about 8 to about 75 RPM.

The very fine powder is passed to the fourth zone where the cross sectional open area barrel is expanded and gas introduced sufficient to fluidize the powder to prevent agglomeration and to convey the powder through a discharge means in the fourth zone. Any gas which is not chemically reactive with the powder material may be used as a fluidizing gas. Air at ambient temperature is a preferred fluidizing gas which additionally cools the powder. The fluidizing gas may be introduced to the hollow barrel in the third and fourth zones by any suitable method known to the art. The cross sectional open area may be suitably expanded by reduction of the cross sectional area of the screw, increase in distance between flights of the screw, or by reduction of the taper or actual divergence of the barrel housing. The fluidized very fine powder may be discharged from a suitable opening in the barrel housing.

The aspect of this invention relating to fluidizing pulverized powder in a gas stream following pulverization to prevent its agglomeration is applicable to any process for solid state pulverization by shear extrusion. The fluidizing is carried out in an expanding volume which may be provided by a diverging chamber and by providing larger distances between flights of a screw passing through such a fluidized zone. It is further desired that the fluidized powder is cooled in an expanding volume zone. These features aid in expanding the powder from a packed bed condition to a fluidized bed condition releasing forces from the contacting particles and basically float them, significantly preventing agglomeration.

For reprocessing, means are provided for passing at least oversized formed particles back to the feed means of the same solid state shear extrusion pulverizer or to another similar apparatus. A plurality of similar apparatus may be used in series to provide continuous production and use of the most advantageous operating conditions for different size particles. In preferred embodiments, separation of produced particles over a preset desired size may be achieved by any suitable sizing means, such as a sieve, and oversized particles conveyed by any suitable means to the feed means of a solid state shear extrusion extrusion pulverizer as described above. Using reprocessing, a powder having particles of weight average size of less than 100 microns can be readily achieved.

The process and apparatus has been described with emphasis on synthetic and natural polymer recycling. The same process and apparatus may also be used to enhance reactivity of polymeric and solid monomeric materials. Under the conditions of pressure and shear to form very fine powders, as described above, the coefficients of diffusion and mass transfer increase by several orders of magnitude and new properties are imparted to the material. Thus, at the moment of shear, reactions of polymerization, polycondensation, polyaddition with formation of high molecular weight compounds takes place as more fully described in the article by Nikolai S. Enikolopian, Supra., incorporated herein by reference in its entirety. The reactions as described by Enikolopian are enhanced by use of the conical meshing screws in the powder formation zone, as described in this invention. The process for enhancement of reactivity of polymeric and solid monomeric materials is conducted by heating the material to a pre-melt temperature, cooling the material and applying normal and shear forces sufficient to form fine powder. Homopolymers, copolymers and new polymeric materials may be formed by use of the process and apparatus of this invention.

The following specific examples are set forth using specific materials, apparatus and process conditions, to further explain the invention and should not be considered to limit the invention in any way.

EXAMPLE I

Low density polyethylene of 55 melt flow index in granules about 5 mm in size were fed to the first zone at the large end of a continuously converging barrel housing two continuously converging conical shaped nonmodular meshing screws, as shown in FIG. 1. The conical screws had a length of 14 inches and diameter range of 1.67 inch to 1 inch and were driven by a geared electric motor in counter rotation at 45 RPM. Pressure in the barrel was slightly below atmospheric in the heating zone and atmospheric in the cooling and powder formation zones. Torque was between 7.0 and 8.0 MKg. The temperature at a location close to the barrel wall in the heating or zone 2 was maintained at 80° C. by electric heaters to heat the low density polyethylene to the desired pre-melt temperature below its melting point of 118° C. Cooling was provided to zone 3 by chilled water jackets surrounding the barrel housing to cool the polyethylene to 30° C. at the barrel wall. Room temperature air was added to the end portion of zone 3 to fluidize and further cool the powder. About 30 percent of the resulting powder was comprised of particles smaller than 177 microns. Except for small quantities, about 15 percent or less, the remaining larger particles were not larger than 700 microns.

EXAMPLE II

The low density polyethylene powder produced in Example I was reprocessed through the same apparatus and under the same operating conditions as Example I, except the torque was between 2 to 4 MKg. Reprocessing significantly reduced the particle size with about 80 percent of the recycled particles being smaller than 177 microns. Excluding about 6 percent of the particles which were slightly larger than 425 microns, the remaining 94 percent of the particles had a weight average particle size of about 130 microns. It can be expected that reprocessing the larger particles, greater than about 200 microns, that the average particle size would again be significantly reduced. A practical goal would be sufficient reprocessing to reduce the weight average particle size to less than 100 microns.

EXAMPLE III

Low density polyethylene of 35 melt flow index in granules of 5 mm size were fed to the first zone at the large end of a continuously converging barrel housing two continuously converging conical shaped nonmodular meshing screws as shown in FIG. 1. The conical screws had a length of 14 inches and diameter range of 1.67 to 1 inch and were driven by a geared electric motor in counter rotation at 45 RPM. The pressure in the barrel was slightly below atmospheric in the heating zone and atmospheric in the cooling/powder formation zone. Torque was 7.5 to 10 MKg. The temperature at the barrel wall in the heating or zone 2 was maintained at 75° C. by using electric heaters to heat the low density polyethylene to the desired temperature below its melting point of 118° C. Cooling was provided to zone 3 by chilled water jackets surrounding the barrel housing to cool the polyethylene powder to 30° C. at the barrel wall. Cool air was supplied to zone 4 to fluidize and cool the polyethylene powder. About 10 percent of the resulting polyethylene powder had an average particle size smaller than 250 microns. It is believed that significant bypassing and reagglomeration of the produced powder occurred using the laboratory-scale apparatus.

EXAMPLE IV

Low density polyethylene particles which were produced in Example III were reprocessed through the same apparatus under the same conditions as Example III, except the torque ranged from 1.0 to 3.0 MKg. The single recyle significantly reduced the particles sizes with more the 50 percent of the resulting reprocessed particles smaller 250 microns. The weight average size of more than 70 percent of the particles that were less than 425 microns was about 140 microns. Further reduction in particle size would be expected by further reprocessing of the larger particles.

EXAMPLE V

Composite materials based on edge trim trial chopping samples from polyester fabrics and polyvinyl chloride film of 20×20 mm size were fed to the first zone at the large end of a converging barrel housing two continuously converging conical shaped non-modular meshing screws, as shown in FIG. 1. The conical screws had a length of 14 inches and diameter range of 1.67 to 1 inch and were driven by a geared electric motor in counter rotation at 55 RPM. Torque was between 1.5 and 3.0 MKg. The temperature in the barrel wall in heating zone 2 was maintained at 200° C. in the first portion and 235° C. in the latter portion using electric heaters to heat the material to the desired pre-melt softening temperature just below the polyester melting temperature of 262° C. Cooling was provided to zone 3 by chilled water jackets surrounding the barrel housing to cool the powder to 30° C. at the barrel wall. Room temperature air was added to zone 4 to fluidize and cool the powder. About 23 percent of the particles resulting from processing of the composite materials were smaller than 425 microns and about 22 percent of the particles were larger than 1500 microns.

EXAMPLE VI

The particles produced in Example V by a single pass through the apparatus were reprocessed in a second pass through the same apparatus under the same operating conditions as Example V. The reprocessed particles had a considerably smaller size with about 32 percent of the particles smaller than 425 microns and only about 8 percent of the particles larger than about 1500 microns.

Using a pilot scale solid state shear extruder, it is expected that, with better materials and more accurate and uniform clearance between the screws and the barrel, the result will be a significant reduction, or probable elimination, of bypassing particles. Further, sieves were used in the particle size distribution analysis which, in general, resulted in larger apparent particle sizes due to agglomeration and improper orientation of the particles on the sieves during shaking of the trays.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A process for solid state shear extrusion pulverization of a polymeric material of the type which thermally softens at a lower temperature than its melting temperature comprising; heating said polymeric material to a pre-melt softening temperature below its melting point, cooling the heated polymeric material from said pre-melt softening temperature and applying normal and shear forces sufficient to form fine powder of said polymeric material, and fluidizing said fine powder in a gas stream preventing its agglomeration.

2. A process for solid state shear extrusion pulverization according to claim 1 wherein said applying of normal and shear forces is conducted by counter-rotating meshing screws rotated at about 4 to about 90 RPM.

3. A process for solid state shear extrusion pulverization according to claim 2 wherein up to about 40 MKg torque is applied.

4. A process for solid state shear extrusion pulverization according to claim 1 wherein said gas stream is at a lower temperature than said powder thereby further cooling said powder.

5. A process for solid state shear extrusion pulverization according to claim 1 wherein said polymeric material is selected from the group consisting of synthetic polymers and natural polymers.

6. A process for solid state shear extrusion pulverization according to claim 1 wherein said pre-melt softening temperature is about 3° to about 50° C. below said melting point of said polymeric material.

7. A process for solid state shear extrusion pulverization according to claim 1 wherein said polymeric material is selected from the group consisting of polyethylene terphthalate, high-density polyethylene, low-density polyethylene, polypropylene, polyvinyl chloride, polystyrene, polyamides, polyurethanes and mixtures thereof.

8. A process for solid state shear extrusion pulverization according to claim 1 wherein said fluidizing said powder in said gas stream provides expansion of the fluidized powder by increasing the cross sectional open area between meshing screws and a barrel housing said meshing screws.

9. A process for solid state shear extrusion pulverization according to claim 1 wherein said fluidizing said powder in said gas stream provides expansion of the fluidized powder by increase in distance between flights of meshing screws.

10. A process for solid state shear extrusion pulverization according to claim 1 comprising the additional step of passing at least the oversized particles of said fine powder for processing through said process.

11. A process for solid state shear extrusion pulverization of a polymeric material of the type which thermally softens at a lower temperature than its melting temperature comprising; heating said polymeric material to a pre-melt softening temperature below its melting point, cooling the heated polymeric material from said pre-melt softening temperature and applying by generally converging conically shaped counter-rotating meshing screws normal and shear forces sufficient to form fine powder of said polymeric material, and fluidizing said fine powder in a gas stream preventing its agglomeration.

12. A process for solid state shear extrusion pulverization according to claim 11 wherein said conically shaped counter-rotating meshing screws rotate at about 4 to about 90 RPM.

13. A process for solid state shear extrusion pulverization according to claim 12 wherein up to about 40 MKg torque is applied.

14. A process for solid state shear extrusion pulverization according to claim 11 wherein said polymeric material is heated to about 60° to about 300° C.

15. A process for solid state shear extrusion pulverization according to claim 11 wherein said polymeric material is cooled to about 20° to about 100° C.

16. A process for solid state shear extrusion pulverization according to claim 11 wherein said gas stream is at a lower temperature than said powder thereby further cooling said powder.

17. A process for solid state shear extrusion pulverization according to claim 11 wherein said polymeric material is selected from the group consisting of synthetic and natural polymers, copolymers, homopolymers, and mixtures thereof.

18. A process for solid state shear extrusion pulverization according to claim 11 wherein said pre-melt softening temperature is about 3° to about 50° C. below said melting point of said polymeric material.

19. A process for solid state shear extrusion pulverization according to claim 11 wherein up to about 150 psig pressure is applied during said applying normal and shear forces.

20. A process for solid state shear extrusion pulverization according to claim 11 wherein said polymeric material is selected from the group consisting of polyethylene terphthalate, high-density polyethylene, low-density polyethylene, polypropylene, polyvinyl chloride, polystyrene, polyacrylates, polycarbonates, polyamides, polyurethanes and mixtures thereof.

21. A process for solid state shear extrusion pulverization according to claim 11 wherein said fluidizing said powder in said gas stream provides expansion of the fluidized powder by expanding the cross sectional open area between said meshing screws and a barrel housing said meshing screws.

22. A process for solid state shear extrusion pulverization according to claim 11 wherein said fluidizing said powder in said gas stream provides expansion of the fluidized powder by increase in distance between flights of said meshing screws.

23. A process for solid state shear extrusion pulverization according to claim 11 comprising the additional step of passing at least oversized particles of said fine powder for reprocessing through said process.

24. In a process for solid state pulverization by shear extrusion, the improvement comprising; fluidizing pulverized powder in a gas stream following said pulverization thereby preventing its agglomeration.

25. In a process for solid state pulverization according to claim 24 wherein said fluidizing is carried out in an expanding volume zone.

26. In a process for solid state pulverization according to claim 25 wherein said expanding volume zone is provided by a diverging chamber.

27. In a process for solid state pulverization according to claim 25 wherein said expanding volume zone is further provided by larger distances between flights of a screw through said zone.

28. In a process for solid state pulverization according to claim 25 wherein fluidized powder is cooled in said expanding volume zone.

29. A process for enhancement of reactivity of polymeric and solid monomeric material comprising in sequence; heating said material to a pre-melt or softening temperature, cooling said material and applying normal and shear forces sufficient to form fine powder of said material, and fluidizing said powder in a gas stream preventing its agglomeration.

30. A process for enhancement of reactivity of polymeric and solid monomeric material according to claim 29 wherein said applying of normal and shear forces is conducted by counter-rotating meshing screws rotated at about 4 to about 90 RPM.

31. A process for enhancement of reactivity of polymeric and solid monomeric material according to claim 29 wherein up to about 40 MKg torque is applied.

32. A process for enhancement of reactivity of polymeric and solid monomeric material comprising in sequence; heating said material to a pre-melt or softening temperature, cooling said material and applying by generally converging conically shaped counter-rotating meshing screws normal and shear forces sufficient to form fine powder of said material, and fluidizing said powder in a gas stream preventing its agglomeration.

33. A process for enhancement of reactivity of polymeric and solid monomeric material according to claim 32 wherein said material is heated to about 60° to about 300° C.

34. A process for enhancement of reactivity of polymeric and solid monomeric material according to claim 32 wherein said material is cooled to about 20° to about 100° C.

35. A process for enhancement of reactivity of polymeric and solid monomeric material according to claim 32 wherein said conically shaped counter-rotating meshing screws rotate at about 4 to about 90 RPM.

36. A process for enhancement of reactivity of polymeric and solid monomeric material according to claim 32 wherein up to about 40 MKg torque is applied.

37. In an apparatus for solid state shear extrusion pulverization of solid material, the improvement comprising; means for fluidizing pulverized powder in a gas stream following said pulverization thereby preventing its agglomeration.

38. In an apparatus for solid state shear extrusion pulverization according to claim 37 wherein said improvement additionally comprises increasing the distance between meshing screws and a barrel housing thereby expanding the cross sectional open area between said meshing screws and said barrel housing providing expansion of said fluidized pulverized powder.

39. In an apparatus for solid state shear extrusion pulverization according to claim 37 wherein said improvement additionally comprises increasing the distance between flights of meshing screws providing expansion of said fluidized pulverized powder.

40. In an apparatus for solid state shear extrusion pulverization according to claim 37 wherein said improvement additionally comprises means for providing said gas stream at a lower temperature than said powder thereby cooling said powder.

41. An apparatus for solid state shear extrusion pulverization of polymeric material comprising; a hollow generally converging barrel having a large end and an opposite small end housing a generally converging twin screw extruder having generally converging conical meshing screws in at least a powder formation zone, feed means for feeding said polymeric material to a first zone at said large end of said barrel, discharge means for discharging pulverized powder from a fourth zone at said opposite small end of said barrel, heating means for heating said polymeric material to a pre-melt or softening temperature below its melting temperature in a second zone adjacent said first zone, cooling means for cooling said polymeric material from said pre-melt temperature to a lower temperature and means for applying normal and shear forces sufficient to form fine powder from said polymeric material in a third zone between said second zone and said fourth zone, means for fluidizing said powder in a gas stream in at least one of said third or said fourth zones thereby preventing its agglomeration.

42. An apparatus for solid state shear extrusion pulverization according to claim 41 wherein said heating means is capable of heating said polymeric material to about 60° to about 300° C.

43. An apparatus for solid state shear extrusion pulverization according to claim 41 wherein said cooling means is capable of cooling said polymeric material to about 20° to about 100° C.

44. An apparatus for solid state shear extrusion pulverization according to claim 41 wherein said barrel housing has an increasing inner diameter in said fourth zone providing expansion of the fluidized powder.

45. An apparatus for solid state shear extrusion pulverization according to claim 44 wherein the distance between flights on said screw extruders is increased in said fourth zone providing expansion of the fluidized powder.

46. An apparatus for solid state shear extrusion pulverization according to claim 41 having means for counter rotation of said screws at about 4 to about 90 RPM.

47. An apparatus for solid state shear extrusion pulverization according to claim 41 wherein said means for applying normal and shear forces applies up to about 40 MKg torque.

48. An apparatus for solid state shear extrusion pulverization according to claim 41 additionally having means to provide pressure of up to about 150 PSIg in said third zone.

49. An apparatus for solid state shear extrusion pulverization according to claim 48 additionally having means to reduce pressure to about atmospheric in said fourth zone.

50. An apparatus for solid state shear extrusion pulverization according to claim 41 wherein said generally converging conical meshing screws extend for the full length of said barrel housing.

51. An apparatus for solid state shear extrusion pulverization according to claim 41 wherein said means for applying high normal and shear forces is sufficient to form powder having weight average particle sizes of less than about 250 microns.

52. An apparatus for solid state shear extrusion pulverization according to claim 41 having size separation means for separating produced particles over a preset size and conveying means for transporting separated oversized particles to a solid state shear extrusion pulverization apparatus for reprocessing.

* * * * *